United States Patent [19]

Pullen

[11] 4,140,035
[45] Feb. 20, 1979

[54] PRODUCING DISC RECORDS
[75] Inventor: Geoffrey J. Pullen, Hayes, England
[73] Assignee: E M I Limited, Hayes, England
[21] Appl. No.: 786,834
[22] Filed: Apr. 12, 1977
[30] Foreign Application Priority Data
Apr. 22, 1976 [GB] United Kingdom ............... 16263/76
[51] Int. Cl.² ............................ B23B 1/00; B23B 3/06
[52] U.S. Cl. ........................................... 82/47; 82/58; 82/70.2
[58] Field of Search .................... 82/46, 47, 54, 56, 57, 82/58, 70.2; 83/914

[56] References Cited
U.S. PATENT DOCUMENTS

| 1,821,611 | 9/1931 | Bonisieur | 82/54 |
| 2,134,171 | 10/1938 | Brown | 82/57 |
| 2,584,479 | 2/1952 | MacDonald | 82/57 |
| 2,839,306 | 6/1958 | Bayless | 83/914 |
| 3,186,029 | 6/1965 | Joseph | 82/57 |

*Primary Examiner*—Harrison L. Hinson
*Attorney, Agent, or Firm*—Fleit & Jacobson

[57] ABSTRACT

When trimming a pressed disc record it is desirable that the central hole is concentric with the trimmed edge. Hitherto the central hole or marker produced at the pressing stage has been engaged on transfer while the record is still held in a transfer means to force the record into position for trimming. The invention provides that the record is first transferred and then centralized at the trimming position, while freely movable, e.g. by inserting a taper through the central hole to move the record to the center of the trimmer. Damage to the central hole is thus reduced.

6 Claims, 8 Drawing Figures

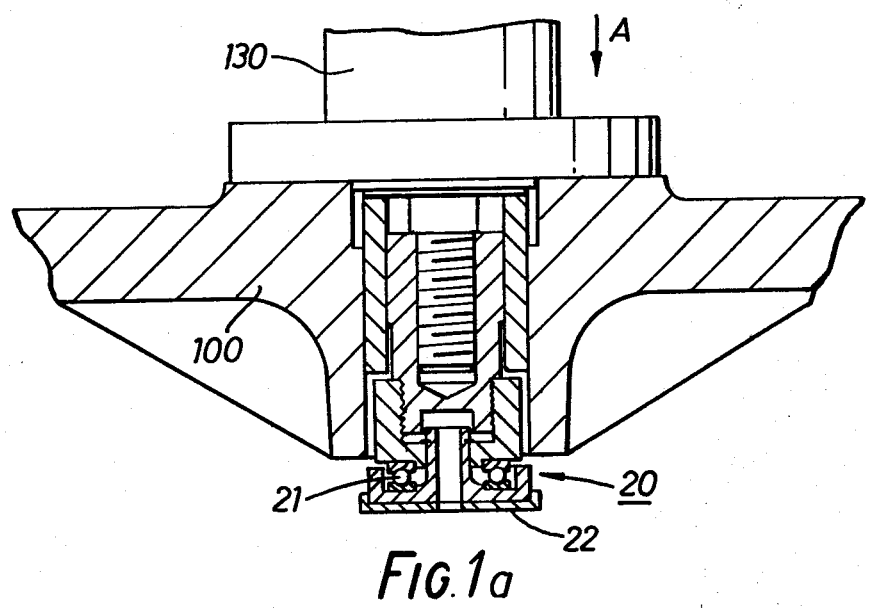
FIG.1a
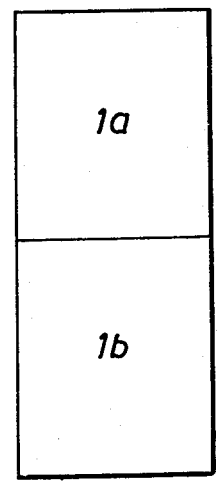

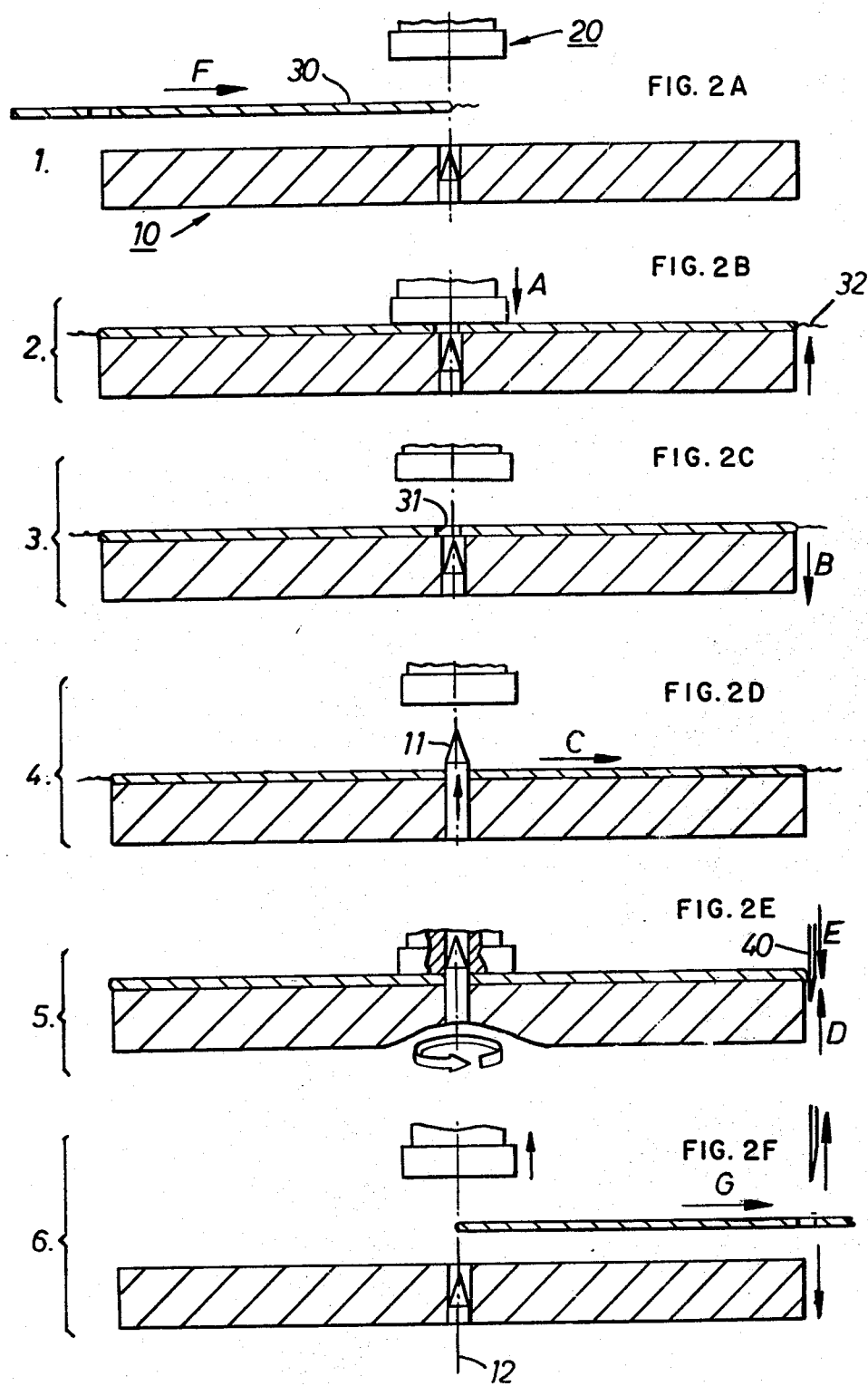

PRODUCING DISC RECORDS

This invention relates to the trimming of flash from disc records during their production.

In the manufacture of disc records by forcing a quantity of plastics material into contact with two opposed matrices bearing the reverse of a surface record formation required on the disc the resulting disc usually has "flash" attached around it. "Flash" is surplus material provided, interalia, to ensure the absence of voids in the disc and must be cut away from the disc to leave a neat edge. The "flash" is usually cut away soon after the disc is formed and when it is still warm and soft and liable to damage or distortion, for example as described U.K. Patent Application No. 42897/74 and corresponding U.S. Pat. No. 4,038,009 and Japanese Patent Application No. 115482/75. In particular if a central hole, which may be the already finished hole eventually used to locate the disc on a turntable spindle when playing the disc record, is subject to stress when moving the disc into position for flash removal the hole may be damaged or distorted. Such stress may occur when a disc record is transported to a trimming position by a transfer means such as a sled and placed on a locating pin at a position set by the stroke of the sled which is liable to the small variations inherent in a mechanism.

It is an object of the invention to improve the removal of flash from a disc record.

According to the invention there is provided a method of trimming a disc record formed with flash attached and at least an indication of the position of the central hole in the disc including:

supplying the formed disc to a flash trimming means, supporting the formed disc in the trimming means without restraint or engaging said hole position for easy lateral movement, moving the supported formed disc in its plane to centralise the actual hole position with the centre of the trimming path of the trimming means, holding the positioned disc in position, trimming the flash from it and releasing the trimmed disc record.

The method may include engaging a tapered member with a hole at the centre of the formed disc record to move the disc. The positioned disc may be held gripped against a turntable. The disc may be initially transferred from a record press transfer sled and released from said sled by such gripping. The disc may be freed for positioning by downward movement of the gripping turntable. The downward movement of the turntable may reveal the tapered member for engagement with the hole position. The member may remain engaged during trimming.

The invention also provides apparatus for trimming flash from a disc record formed with flash attached and at least an indication of the position of the central hole in the disc which includes means operable for gripping a said formed disc without engaging said hole position, further operable to free said formed disc for movement in the trimming means by means to engage said hole position to centralize the hole position with the centre of the trimming path of the trimming and operable to again grip said formed disc in said centralised position for trimming of flash.

The trimming apparatus may be a trimming station of a sled-transfer record press.

Embodiments of the invention will now be described with reference to the accompanying drawings of which:

FIGS. 2a to 2f show an outline of the centralising of a formed disc in the trimming station.

Figure 1B:
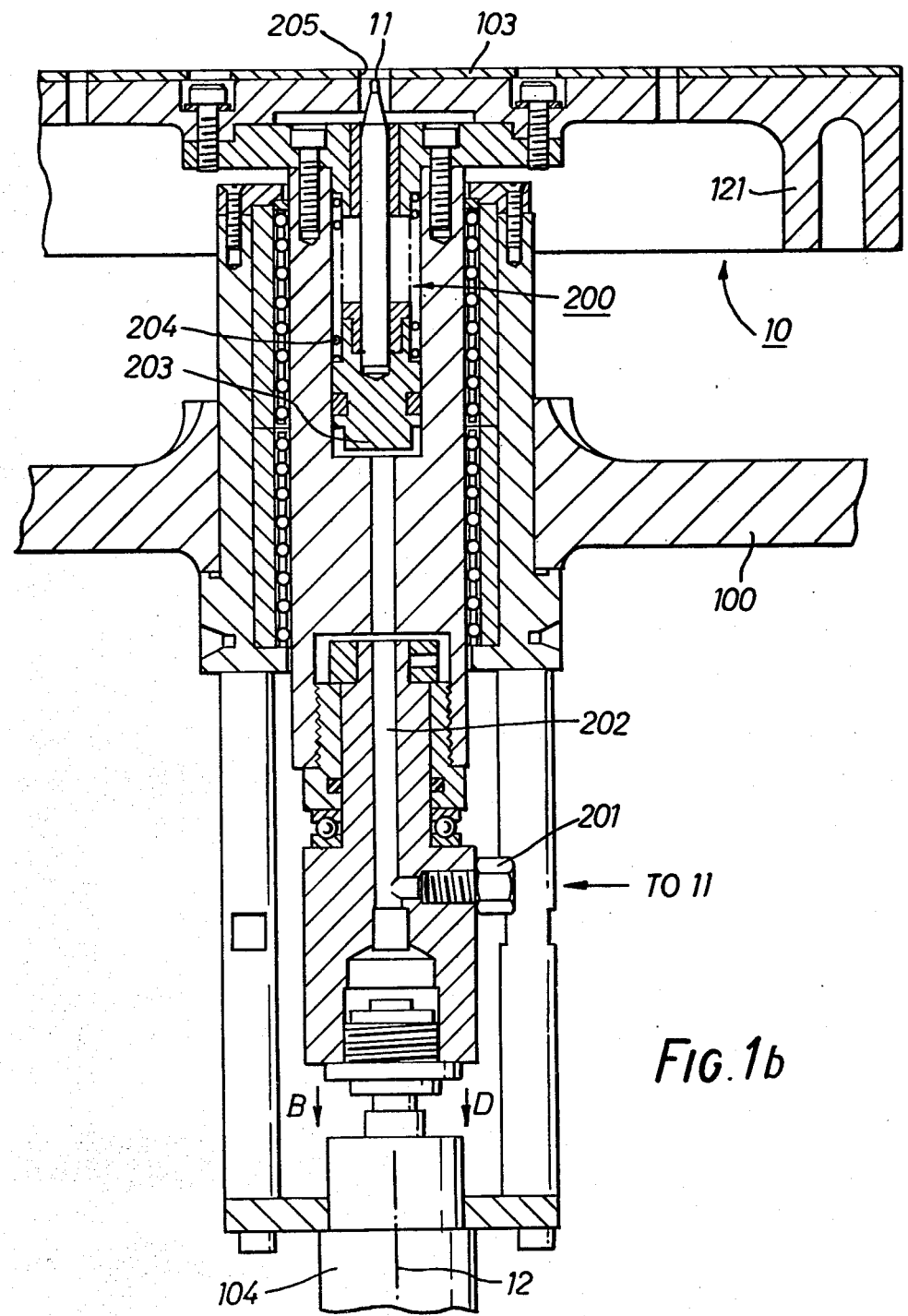
FIG. 1 shows a record press trimming station.

The trimming station may be used in the record press described in U.S. Pat. No. 4,038,009, the disclosure of which is incorporated herein by reference. Details of the press described in the above specification will not be repeated here.

Referring to FIGS. 1 and 2 a turntable 10 is supported for vertical movement and rotation about a central axis. A head 20 is operable e.g. by hydraulic means 130, along arrow A, to grip a formed record 30 against turntable 10. Head 20 may be supported in frame 100 of the record press, as is turntable 20. A ball race 21 is provided in head 20 to permit rotation of surface 22. Formed record 30 has a central hole 31 and attached flash 32. In distinction from previous proposals neither turntable 10 nor head 20 has any projection at this stage, to engage the central hole 31. The formed record after being gripped, as in FIG. 2b, is freed for movement on turntable 10 by lowering the turntable e.g. by hydraulic means 104 as arrow B shows. Taper pin 11 is then pushed upwards with respect to turntable 10 to project from the upper surface of the lowered turntable and engage the central hole 31. Any suitable means may be used to operate pin 11. As shown in FIG. 1b a hydraulic piston and cylinder arrangement 200 is used. Hydraulic fluid supplied over conduit 202 from inlet 201 acts on piston 203 to push pin 11, against return spring 204, through the hole 205 in turntable 10. The taper of pin 11 enters hole 31, even if off axis 12 as shown in FIG. 2c, but will not damage the hole as the formed disc is not gripped. The formed disc is centred on pin 31 on the lower full width part as shown by movement arrow C. On raising turntable 10 e.g. using means 104, arrow D, the formed disc is again gripped, located by pin 11, between head 20 and turntable 10 but this time centralised on axis 12, during the temporary freedom, for trimming by rotation of turntable 10 past a heated knife 40 lowered in direction of arrow E to cut away flash on rotation of turntable 10 about axis 12, FIG. 2e. Turntable 10 may be rotated by drive means not shown, engaging face 121 with a friction drive wheel.

FIG. 1 shows details of a trimming station operating as shown in outline in FIG. 2 with similar parts similarly referenced. Clearly other types of trimmer may be used such as a cutter wheel, in which case the disc centralised on pin 11 need not also be gripped for trimming. The formed record with flash may be supplied to the trimming station by a sled (not shown) transferring the record, in direction F, and removed by the sled after trimming, G.

The trimming station described above permits accurate trimming of records, with reference to the central hole, without risk of damage to the hole while the record is in the soft state.

This improves the yield of the record press and avoids waste of valuable material. Furthermore the transfer of the record to the trimming stage need not be so accurately controlled, the latitude for centering the record after release coping with quite large inaccuracies, e.g. 2 to 3 mm.

What I claim is:

1. A method of trimming a disc record with a center hole therein and having flash attached on the periphery thereof by apparatus having a turntable record support means having an axis of rotation, a record support surface and a periphery, a gripping means having an axis and a record gripping surface, and a centering means having an axis with all said axes being in axial alignment and said centering means being advanceable and retractable through said support surface of said record support surface, said method comprising: supplying the record disc to the record support means, temporarily gripping the said disc between said gripping means and said support means in a rough centered position to release said disc from a supplying means, releasing the gripping means from said disc, advancing the said centering means through said support surface and center hole in said disc to final center said disc in its radial plane, gripping said disc in centered position, trimming the flash from said disc, releasing said gripping means and retracting said centering means prior to removing said disc along a path of its radial plane.

2. A method according to claim 1 wherein said centering means comprises a tapered member.

3. A method according to claim 1 including supplying the disc with flash attached by a record press transfer means.

4. Apparatus for trimming flash from a record disc having a center hole therein comprising: a turntable record support means having an axis of rotation, a record support surface and a periphery, a gripping means having an axis and a record gripping surface and, a centering means having an axis, said axes of said support means, said gripping means and said centering means being axially aligned, said centering means being advanceable above and retractable below said support surface, means operable to relatively advance the said support surface and said gripping surface toward one another to grip a record therebetween in a rough centered position and to temporarily release gripping of a record in rough centered position, means to advance and retract said centering means through said support means to cooperate with a center hole in a disc record to final center a disc record, and trimming means located adjacent the periphery of said support means to trim flash from a record on said support means.

5. Apparatus according to claim 4 in which the centering means is a tapered spindle.

6. A sled-transfer record press including apparatus for trimming flash according to claim 4.

* * * * *